United States Patent [19]

Ishikawa

[11] Patent Number: 5,465,182
[45] Date of Patent: Nov. 7, 1995

[54] RECORDING METHOD OF SERVO INFORMATION

[75] Inventor: Tetsuro Ishikawa, Kawasaki, Japan

[73] Assignee: Fujitsu Limited, Kawasaki, Japan

[21] Appl. No.: 58,011

[22] Filed: May 5, 1993

[30] Foreign Application Priority Data

May 6, 1992 [JP] Japan ............................... 4-113280

[51] Int. Cl.$^6$ .................................................. G11B 21/02
[52] U.S. Cl. ........................... 360/75; 360/53; 360/77.05
[58] Field of Search ......................... 360/51, 48, 77.05, 360/77.08, 78.14, 75, 77.07, 53

[56] References Cited

U.S. PATENT DOCUMENTS

| | | | |
|---|---|---|---|
| 4,238,809 | 12/1980 | Fujiki et al. | 360/77.05 |
| 4,414,589 | 11/1983 | Oliver et al. | 360/77.08 |
| 4,516,162 | 5/1985 | West | 360/77.08 |
| 4,531,167 | 7/1985 | Berger | 360/77.08 |
| 4,631,606 | 12/1986 | Sugaya | 360/77.08 |
| 4,797,754 | 1/1989 | Sugano et al. | 360/48 |
| 5,184,341 | 2/1993 | Hamasaka et al. | 360/53 |
| 5,202,802 | 4/1993 | Sidman | 360/77.05 |

FOREIGN PATENT DOCUMENTS

| | | |
|---|---|---|
| 59-56214 | 3/1984 | Japan . |
| 60-131680 | 7/1985 | Japan . |
| 60-189516 | 9/1985 | Japan . |
| 63-164081 | 7/1988 | Japan . |
| 1-130370 | 5/1989 | Japan . |
| 2-33781 | 2/1990 | Japan . |
| 4-28067 | 1/1993 | Japan . |
| 2226911 | 7/1990 | United Kingdom ............... 360/77.05 |

*Primary Examiner*—Georgia Y. Epps
*Assistant Examiner*—P. W. Huber
*Attorney, Agent, or Firm*—Greer, Burns & Crain, Ltd.

[57] ABSTRACT

After servo information for positioning is written onto a magnetic disk medium on a track unit basis by a head, the servo information of the same track is read out and stored into a memory. Subsequently, during the seeking operation to move the head to the next track, the servo information at a time point when the head is on-tracked is arithmetically operated from the preceding read-out servo information stored in the memory and the present read-out servo information and the quality is verified.

11 Claims, 13 Drawing Sheets

RECORDING METHOD OF SERVO INFORMATION

BACKGROUND OF THE INVENTION

The present invention relates to a method of recording servo information whereby servo information which is used to position a head is written onto a servo surface of a magnetic disk by using a servo track writer and, more particularly, to a servo information recording method whereby servo information is written and, thereafter, the servo information is read out and is verified to discriminate whether the servo information has correctly been recorded or not.

In the manufacturing steps of a magnetic disk apparatus, at a time point of the completion of the assembly of a disk enclosure, servo information is written onto the servo surface of a magnetic disk in the disk enclosure by using a servo track writer. The writing step of the servo information comprises: a step called a laser mode for writing the servo information onto the servo surface of the magnetic disk while precisely measuring a rotational angle of a voice coil motor by a laser length measuring device; and a step called a magnetic mode for reading out the servo information written on the servo surface of the magnetic disk and on-track controlling the head by a position signal derived from a read signal, thereby verifying a quality of the servo information.

A conventional servo information recording method by the servo track writer will be further described in detail. In the laser mode, first, the head position is detected by the laser length measuring device and the servo head is precisely positioned to a track position at which the servo information should be written. Subsequently, the servo information is written to one circumference of the track of the magnetic disk medium by the servo head. Remaining tracks are done in similar fashion. Such a writing process of the servo information is repeated in the direction from the outer track of the magnetic disk toward the inner track.

After the servo information was written in the laser mode, the quality of the written servo information is verified in the magnetic mode. That is, the servo information written on the magnetic disk is read out by the servo head and a position signal is formed. The servo head is positioned over the track (on-track) by the servo control based on the position signal. A read signal of the servo information which is obtained in an on-track state of the servo head is supplied to a hardwired verifying circuit thereby verifying the quality of the servo information. The verifying circuit discriminates whether pulses in the read-out background of the servo information are missing or not, whether extra pulses exist or not, and the like. After the servo information of one track was verified, the servo head is sought to the next track. Such a verifying process is repeated in the direction from the outer track to the inner track of the magnetic disk medium.

However, such a conventional recording method using the servo track writer has a problem in that it takes a long time to write and verify the servo information. First, in the laser mode, it takes a time corresponding to a total of two rotations of the disk: One rotation of the disk in order to write the servo information per track and one rotation in order to control the operation to seek the servo head to the next track. Therefore, a processing time in the laser mode is equal to the time which is obtained by multiplying the total number of tracks to the time which is required for two rotations of the disk. In the magnetic mode, it takes a time corresponding to total two rotations of the disk: One rotation to read out the servo information per track and one rotation for the seeking control to the next track. Therefore, a processing time in the magnetic mode is equal to the time which is obtained by multiplying the total number of tracks to the time which is required for two rotations of the disk. Thus, the time necessary to write and verify the servo information is equal to the time which is obtained by multiplying the total number of tracks to the time that is required for four rotations of the disk.

Additionally, since a special verifying circuit constructed by the hardware is needed, costs are high and the verifying circuit is influenced by noises due to the characteristics of the verifying circuit or the like, an adjustment to accurately perform the inspection is troublesome.

SUMMARY OF THE INVENTION

According to the present invention, there is provided a recording method of servo information which can reduce the processing time that is required to write and verify servo information and can improve a productivity.

According to the present invention, there is provided recording method of servo information, comprising: a writing, using a head servo information for positioning on a magnetic disk medium track reading step of reading, using said head, out the servo information on the written track in said writing track and storing into memory; a seeking the head to an adjacent track subsequent to the reading step; and a repeating said writing, reading out and seeking if said track was a first track; and if said track was not a first track arithmetically verifying preceding servo information read at a time when the head is on-track for reading the preceding read-out servo information stored in the memory and the present read-out servo information during the seeking step judge whether the present and preceding servo information is correct or not.

In the writing step, reference clocks which have previously been written onto the magnetic disk medium are read out by a reference head and at least four kinds of different first to fourth servo patterns are sequentially repeatedly written in track units as servo information synchronously with the read-out reference clocks. That is, the same servo pattern is repeatedly written to one track and the first to fourth servo patterns are sequentially repeatedly written in a tracks. The first to fourth servo patterns have first, second, third, and fourth selective magnetic polarity inverting positions subsequent to the magnetic polarity inverting position indicative of index information. The first servo pattern inverts the magnetic polarity at the first and fourth positions. The second servo pattern inverts the magnetic polarity at the first and third positions. The third servo pattern inverts the magnetic polarity at the second and third positions. Further, the fourth servo pattern inverts the magnetic polarity at the second and fourth positions.

In the reading step, an analog signal of the servo information read out by the reference clocks which had been read out by the reference head is sampled and stored into a memory on a track unit basis.

In the verifying step which is executed during the head seeking operation, a missing of pulses of the read-out waveform in the on-track state is judged from the mean value of the sampling peak values of the pulse waveforms which are generated at the same magnetic polarity inverting positions of the preceding servo pattern and the present servo pattern. On the other hand, the presence or absence of extra pulses of the read-out waveform in the on-track state is judged from the mean value of the sampling values at the positions at which no magnetic polarity inversion occurs in the preceding servo pattern and the present servo pattern. A check is made to see if the position signal is correct or not from a difference between the mean values of the sampling peak values of the waveforms which are generated at the positions at which the magnetic polarity inversion occurs in either one of the preceding servo pattern and the present servo pattern.

The verification of the servo information which is executed during the seeking operation is processed by reading out the servo information stored in the memory by a digital signal processor.

As a head which is used in the writing step and reading step, a servo head assembled in the disk enclosure having the magnetic disk medium onto which the servo information should be written can be used or a special head only for use by the servo writer can be also used.

The above and other objects, features, and advantages of the present invention will become more apparent from the following detailed description with reference to the drawings.

DETAILED DESCRIPTION OF THE PREFERRED EMBODIMENT

Figure 1:
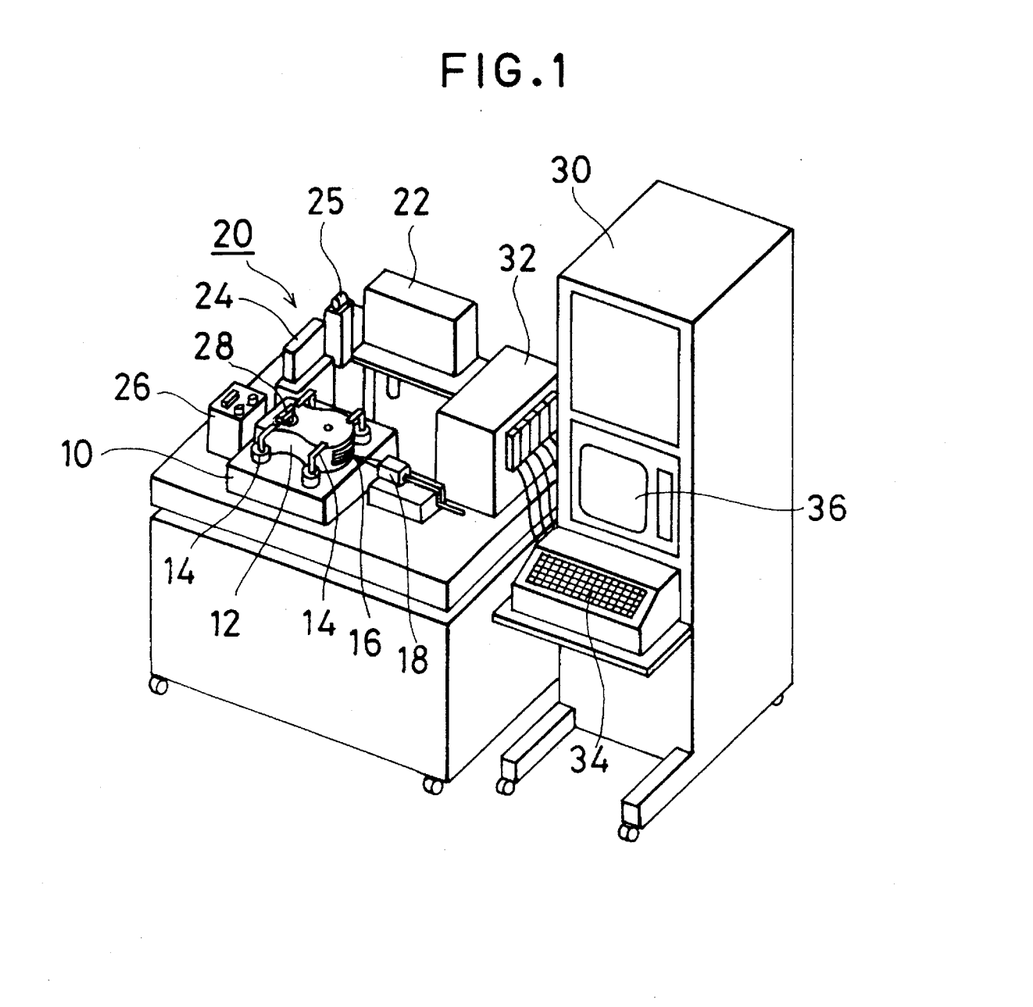
FIG. 1 is an explanatory diagram of a servo track writer which is used in the present invention.

FIG. 1 shows a servo track writer which is used to record servo information according to the present invention. A disk enclosure 12 which has been assembled to a certain degree is mounted on a measurement table 10 and is positioned and fixed by a locking mechanism 14. A laser length measuring apparatus 20 is arranged on the left side of the disk enclosure 12. A cylinder device 18 having a reference head 16 is arranged on the right side of the disk enclosure 12. The laser length measuring apparatus 20 is constructed by a laser emitter 22, a photo sensitive arithmetic operating unit 24, a polarizing prism 25, an optical unit 26, and a mirror device 28. The mirror device 28 is attached to a head pivot shaft located on the inner side of an upper opening of the disk enclosure 12. The writing and verifying operations of the servo information to the servo surface of the magnetic disk built in the disk enclosure 12 are executed by a control unit 30. A keyboard 34, a display 36, and a printer (not shown) are provided for the control unit 30. The control unit 30 is connected to each of the measuring system on the side of the disk enclosure 12 through a drive unit 32 by signal lines.

Figure 2:
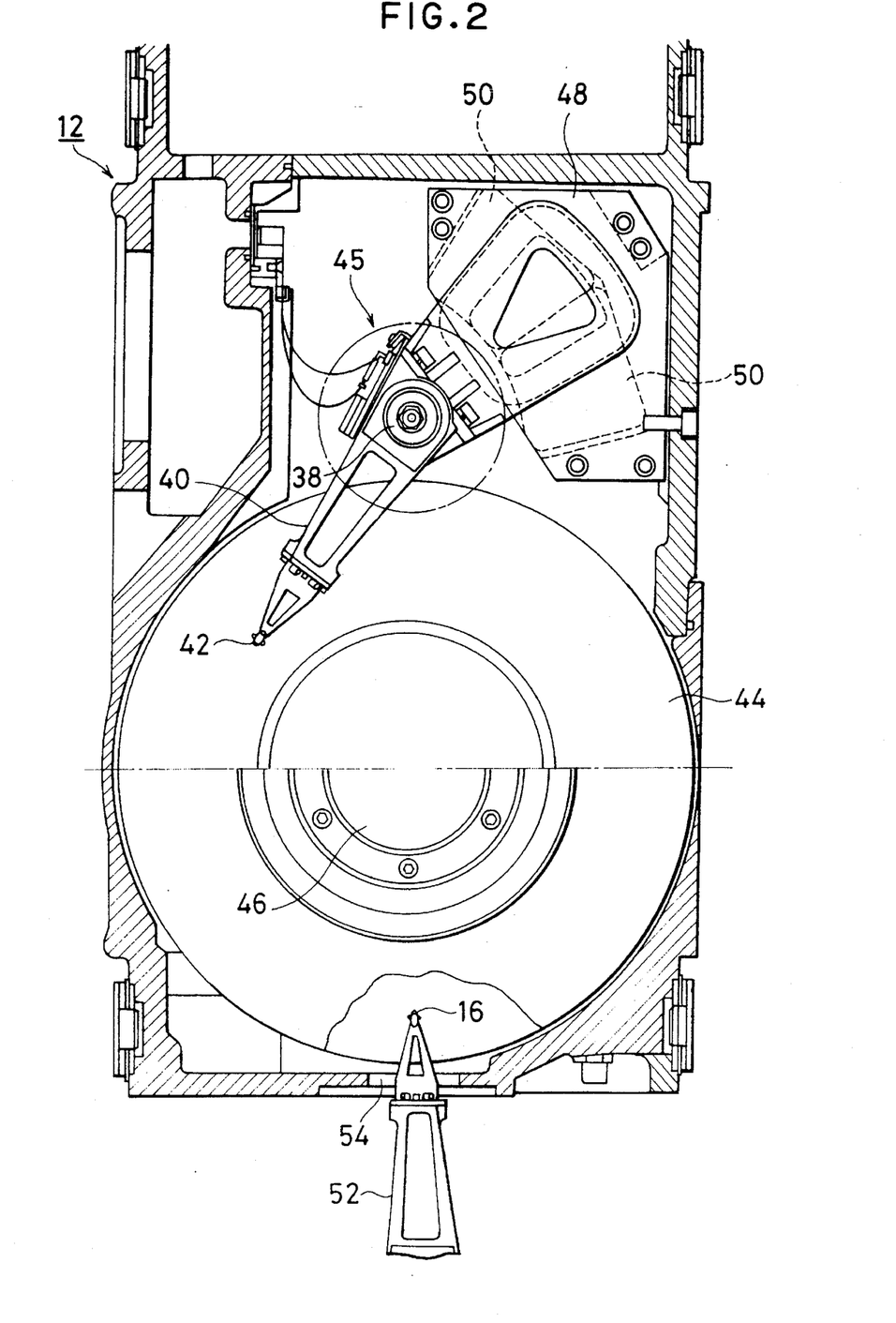
FIG. 2 is a cross sectional view showing a recording state for the servo surface in a disk enclosure.

FIG. 2 shows a cross sectional view of the disk enclosure 12 of FIG. 1. A disk rotating shaft 46 which is rotated by a spindle motor is provided in a casing of the disk enclosure 12. In the embodiment, six magnetic disks 44 are attached to the disk rotating shaft 46. Among the six magnetic disks 44, the surface of the top disk (shown in the diagram) is used as a servo surface and the surfaces of the other remaining disks are used as data surfaces. A head arm 40 which can be freely turned by a head pivot shaft 38 is provided for the magnetic disk 44. A servo head 42 is attached to an edge of the head arm 40. Another head arm is also provided on the lower side of the head arm 40 and a data head is attached to an edge of the head arm.

The servo head 42 can be moved in the radial direction of the magnetic disk 44 by rotating around the head pivot shaft 38 as a rotational center. A coil 50 constructing a voice coil motor is provided on the opposite side of the head arm 40 through the head pivot shaft 38. A magnetic circuit 48 having a permanent magnet is fixed to the casing side. Therefore, the head arm 40 is rotated around the head pivot shaft 38 as a center in accordance with a current supplied to the coil 50 of the voice coil motor and the servo head 42 and the data head (not shown) can be integratedly positioned to an arbitrary position of the disk medium. The reference head 16 is arranged through a head arm 52 from an opening portion 54 of the casing which faces the head arm 40 in the disk enclosure 12. The reference head 16 is set over the data surface of the magnetic disk locating on the lower side instead of the servo surface over which the servo head 42 is located. Further, an opening hole 54 to attach the mirror device 28 that is used by the laser length measuring apparatus from the outside is formed in a casing locating above the head pivot shaft 38 provided for the head arm 40.

Figure 3:
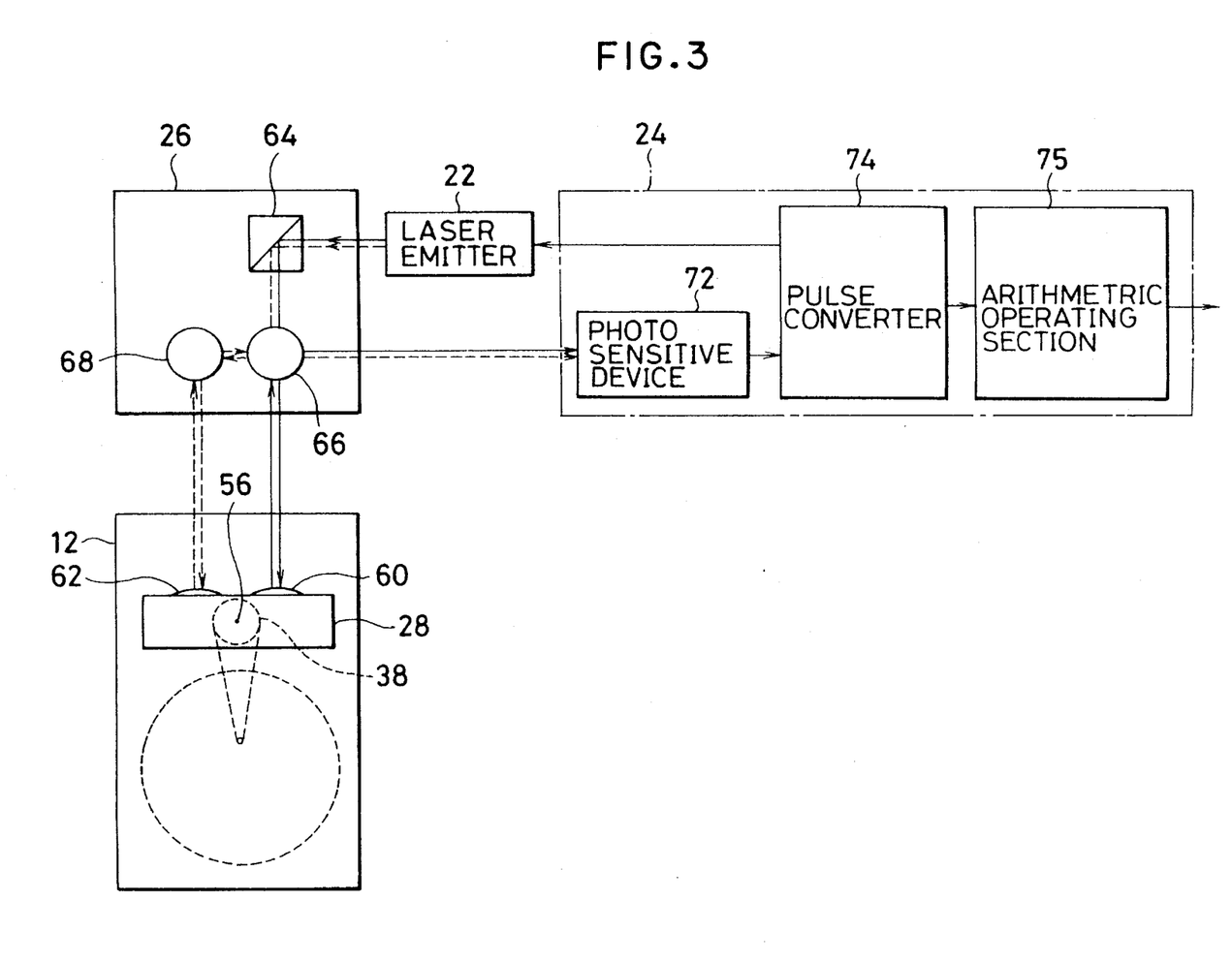
FIG. 3 is an explanatory diagram of a measuring system by a laser length measuring device.

FIG. 3 shows the details of the laser length measuring apparatus arranged for the disk enclosure in FIG. 1. The laser length measuring apparatus 20 is constructed by the photo sensitive arithmetic operating unit 24, optical unit 26, and mirror device 28. A photo sensitive device 72, a pulse converter 74, and an arithmetic operating section 75 are provided for the photo sensitive arithmetic operating unit 24. A beam bender 64, an interferometer 66, and a beam bender 68 are provided for the optical unit 26. The mirror device 28 is fixed to the head pivot shaft 38 locating on the inner side than the opening of the disk enclosure 12 and is rotated around a rotational center 56 integratedly with the head pivot shaft. The mirror device 28 has two eyeballs 60 and 62. Each of the eyeballs 60 and 62 is a special optical device for returning an incident light from the outside to a predetermined direction. A laser beam emitted from the laser emitter 22 directly enters one eyeball 60 of the mirror device 28 from the beam bender 64 through the interferometer 66. The laser beam is subsequently reflected by the eyeball 60 and is returned to the interferometer 66. The movement of the laser beam in this instance is shown by arrows of solid lines in the diagram. At the same time, the laser beam emitted from the laser emitter 22 passes through the beam bender 64, interferometer 66, and beam bender 68 and enters the other eyeball 62 of the mirror device 28. The laser beam is subsequently reflected by the eyeball 62 and is returned to the interferometer 66 from the beam bender 68. The movement of the laser beam in this instance is shown by arrows of broken lines in the diagram. When a head rotary shaft is rotated by the driving of the voice coil motor of the disk enclosure 12, the mirror device 28 is also simultaneously rotated, so that lengths of optical paths between the interferometer 66 and the two eyeballs 60 and 62 change, respectively. Interference pulses of two light beams are generated from the interferometer 66 to the photo sensitive device 72 due to changes in the two optical path lengths for the eyeballs 60 and 62. The photo sensitive device 72 converts the interference pulse from the interferometer 66 into the electric signal and supplies to the pulse converter 74. The pulse converter 74 converts the interference pulses into the number of pulses indicative of a pitch sense of an interference fringe. An output of the pulse converter 74 is supplied to an arithmetic operating section 75 and a rotational angle of the head pivot shaft 28 is precisely measured on the basis of the pitch sense of the interference fringe according to a difference between the optical path lengths to the eyeballs 60 and 62. The positioning of the servo head 42 to the write track shown in FIG. 2 is executed by using the result of such a precise measurement of the rotational angle of the head pivot angle 28 by the laser length measuring apparatus 20 as mentioned above.

Figure 4:
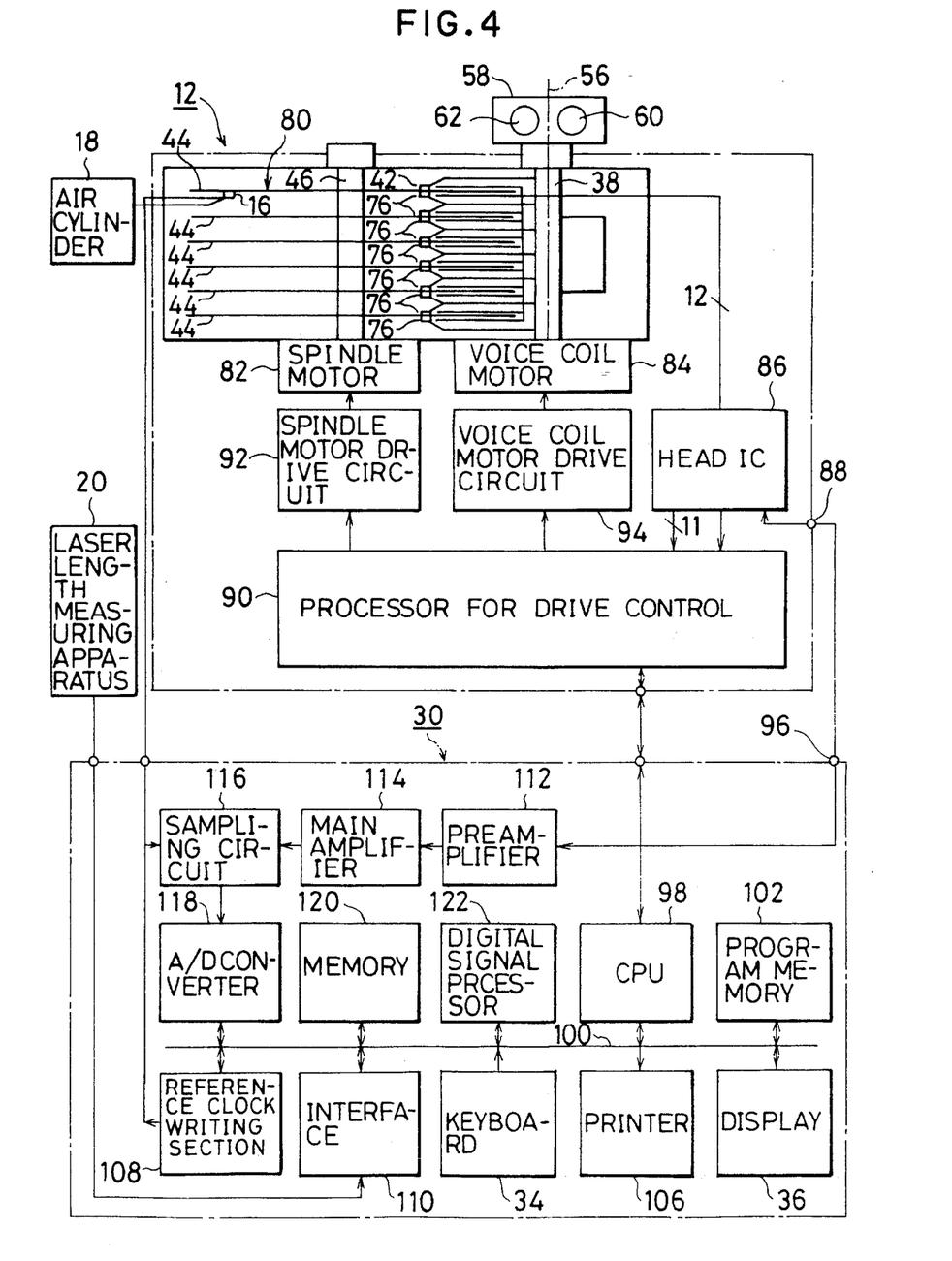
FIG. 4 is a block diagram showing an embodiment of a measurement control unit of the present invention together with circuits on the disk enclosure side.

FIG. 4 shows an embodiment of the control unit 30 shown in FIG. 1 together with circuits on the disk enclosure side. First, six magnetic disks 44 which are rotated by a spindle motor 82 are attached to the disk rotating shaft 46 in the casing of the disk enclosure 12. The servo head 42 and a plurality of data heads 76 are attached to the head pivot shaft 38 of a voice coil motor 84 by head arms. Among a plurality of magnetic disks 44, the upper surface of the magnetic disk 44 locating at the top position is used as a servo surface 80 and the servo head 42 is located over the servo surface 80. The spindle motor 82 is driven by a spindle motor drive circuit 92. The voice coil motor 84 is driven by a voice coil motor drive circuit 94. The servo head 42 and a plurality of data heads 76 are connected to a head IC 86 by signal lines. A preamplifier for reading and a writing amplifier for writing are provided for the head IC 86 every servo head 42 and data head 76. Inputs and outputs for the outside from a terminal 88 can be selectively connected to the servo head 42. A processor 90 for a drive control executes various kinds of processes which are necessary to read and write data among the spindle motor drive circuit 92, voice coil drive circuit 94, and head IC 86. A mirror device 58 of the laser length measuring apparatus 20 is attached to the head of the head pivot shaft 38 provided in the disk enclosure 12. The mirror device 58 can be rotated integratedly with the head pivot shaft 38 by the driving of the voice coil motor 84.

The control unit 30 has a CPU 98 to execute a whole control process to write and verify the servo information. A program memory 102 in which programs to execute the writing and verifying processes of the servo information have been stored, the display 36, a printer 106, the keyboard 34, an interface 110 to fetch a measurement signal from the laser length measuring apparatus 20, and a reference clock writing section 108 to write reference clocks by the reference head 16 which is positioned by the air cylinder 18 are connected to a bus 100 of the CPU 98.

The signal line from the servo head 42 via the head IC 86 of the disk enclosure 12 is connected to a terminal 96 of the control unit 30 from the terminal 88 and is further connected to a preamplifier 112. The preamplifier 112 preamplifies the read signal from the servo head 42. A main amplifier 114 is provided for the preamplifier 112. The read signal amplified by the main amplifier 114 is given to a sampling circuit 116 and is sampled by using sampling clocks which were read by the reference head 16 and is converted into the digital data by an A/D converter 118. In the sampling circuit 116, according to the embodiment, the clocks which are obtained by dividing the frequency of the reference clocks read by the reference head 16 into ½ are used as sampling clocks. The read signal which has been converted into the digital data by the A/D converter 118 is stored into a memory 120.

Further, a digital signal processor 122 is connected to the bus 100 of the CPU 98. When a verifying process of the servo information is instructed from the CPU 98, the digital signal processor 122 reads out the read servo information of one track which had been stored in the memory 120 and has been recorded at present and the read servo information of one track which had previously been recorded. The servo information at a time point when the servo head has been on-tracked is obtained by an arithmetic operation from the two adjacent servo information read out, thereby verifying the quality of the recorded servo information.

The detection information of the rotational angle of the head pivot shaft 38 by the laser length measuring apparatus 20 is given to the CPU 98 and is compared with the track information to set the servo head 42 at that time. Deviation information is given to a processor 90 for drive control of the disk enclosure 12. The processor 90 drives the voice coil motor 84 by the voice coil motor drive circuit 94 so as to eliminate the deviation, thereby precisely positioning the servo head 42 to the track position to write the servo information.

Figure 5A:
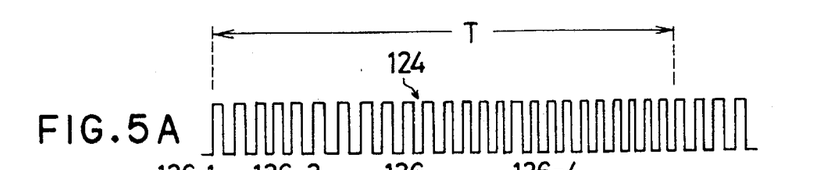
FIGS. 5A to 5F are explanatory diagrams of reference clocks and read-out waveforms of four kinds of servo information and recording magnetization states of tracks.

FIG. 5A shows reference clocks 124 which are used for sampling the read signal of the servo information by the sampling clock circuit 116 of the control unit 30. Namely, FIG. 5A shows the clocks which are obtained by dividing the frequency of the reference clocks which have actually been read by the sampling head 16 into ½.

Figure 5B:
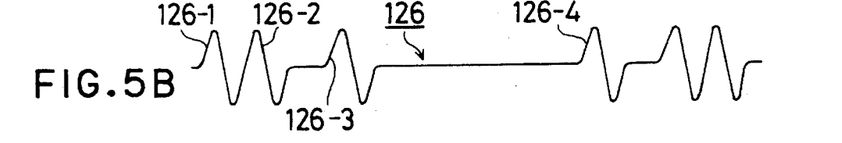
Figure 5C:
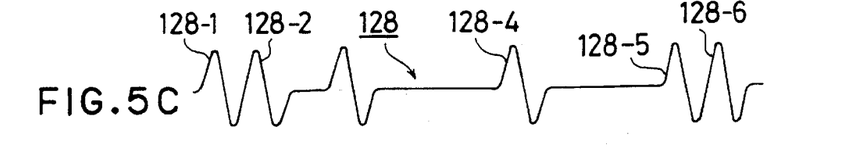
Figure 5D:
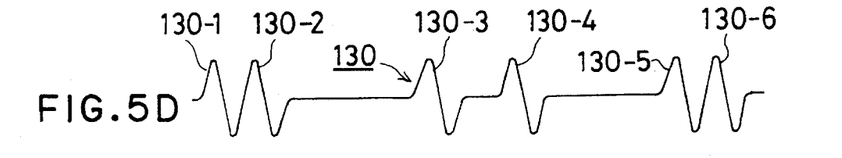
Figure 5E:
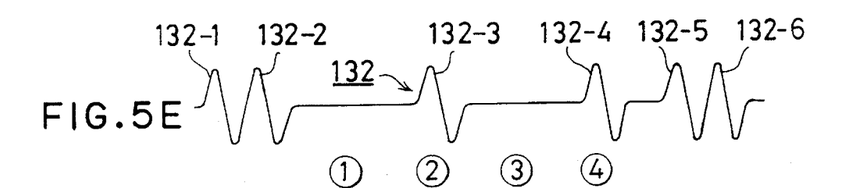
Figure 5F:
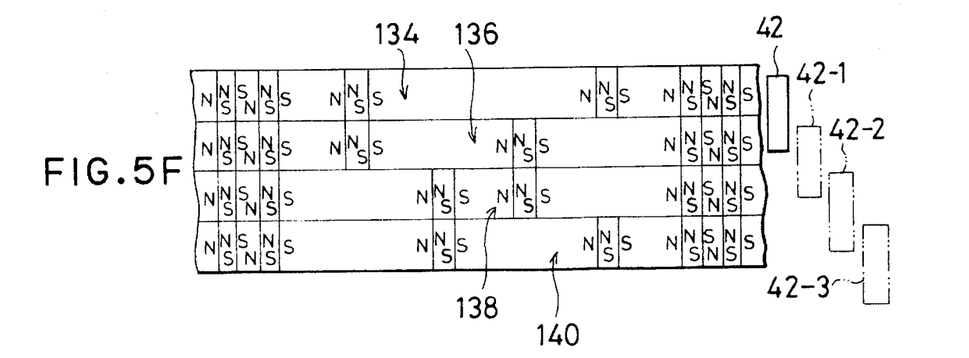

Four kinds of servo patterns 134, 136, 138, and 140 shown in FIG. 5F are magnetically written to the servo surface 80 of the magnetic disk. These patterns are called first pattern 134, second pattern 136, third pattern 138, and fourth pattern 140, respectively. The patterns 134, 136, and 140 have magnetic recording portions, as index information, having magnetic polarity inversions of four times of the heads in the intervals of the periods T which are determined by a disk peripheral velocity and also have four positions shown by ①, ②, ③, and ④ at which the magnetic polarities are selectively inverted for a period of time to the next index information.

FIGS. 5B, 5C, 5D, and 5E show read waveforms of the four kinds of magnetic recording servo patterns of FIG. 5F by the servo head. In a first servo pattern read waveform 126 of FIG. 5B, two index waveforms 126-1 and 126-2 in the beginning of the period T. Subsequently, waveforms 126-3 and 126-4 occur at the magnetic polarity inverting positions ① and ④. In a second servo pattern read waveform 128 of FIG. 5C, subsequent to index waveforms 128-1 and 128-2 in the beginning, waveforms 128-3 and 128-4 occur at the magnetic polarity inverting positions ① and ③. In a third servo pattern read waveform 130 of FIG. 5D, subsequent to index waveforms 130-1 and 130-2 in the beginning, waveforms 130-3 and 130-4 occur at the two magnetic polarity inverting positions ② and ③. Further, in a fourth servo pattern read waveform 132 of FIG. 5E, subsequent to index waveforms 132-1 and 132-2 in the beginning, waveforms 132-3 and 132-4 occur at the magnetic polarity inverting positions ② and ④. The CPU 98 of the control unit 30 shown in FIG. 4 supplies write pulses such that four kinds Of magnetic recording servo patterns as shown in FIG. 5F to the servo head 42 of the disk enclosure 12 and writes the same servo pattern with respect to one track. After the servo pattern of one track was written, the servo head 42 is sought to the next track on the inner side and the next magnetic recording servo patterns are written in accordance with the order of the first to fourth servo patterns.

Figure 6A:
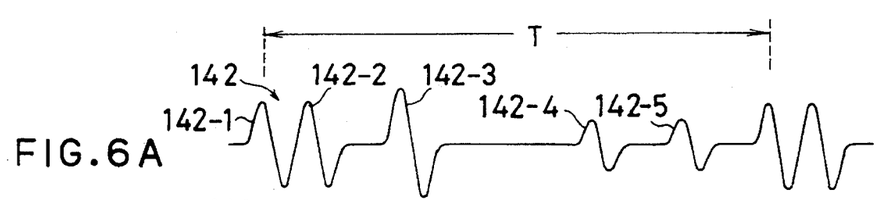
FIGS. 6A to 6D are explanatory diagrams of four kinds of servo waveforms which are read out by on-track control.

FIGS. 6A to 6D show read waveforms which are obtained when the servo head 42 is on-tracked by using the four magnetic recording servo patterns shown in FIG. 5F. As for the on-track of the servo head in FIG. 5F, for example, with respect to the magnetic recording servo patterns 134 and 136, the on-track state is obtained when the center of the servo head 42 reaches the boundary between both of the servo patterns 134 and 136. Therefore, the read waveforms of the magnetic recording servo patterns 134 and 136 by the servo head 42 are the signal waveforms in which two magnetic recording waveforms are added and synthesized. A read waveform 142 in the on-track state of FIG. 6A is a waveform as a mean value which is obtained by adding the first and second servo pattern read waveforms 126 and 128 of FIGS. 5B and 5C and dividing the resultant value by 2.

Figure 6B:
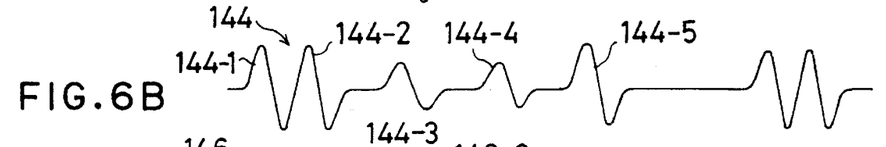

FIG. 6B shows a read waveform when the servo head is on-tracked to a position 42-1 in FIG. 5F. The read waveform 144 is a synthesized waveform as a mean value of the second servo pattern read waveform 128 of FIG. 5C and the third servo pattern read waveform 130 of FIG. 5D corresponding to the magnetic recording servo patterns 136 and 138.

Figure 6C:
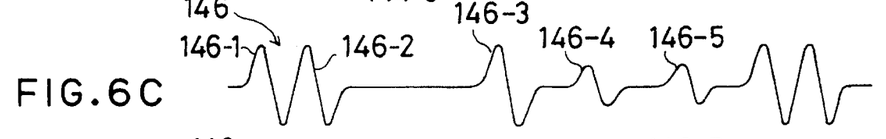

A read waveform 146 in the on-track state of FIG. 6C is a synthesized waveform as a mean value which is obtained by adding the third servo pattern read waveform 130 of FIG. 5B and the fourth servo pattern read waveform 132 of FIG. 5E corresponding to the magnetic recording servo patterns 138 and 140 in FIG. 5F and dividing the resultant waveform by 2.

Figure 6D:
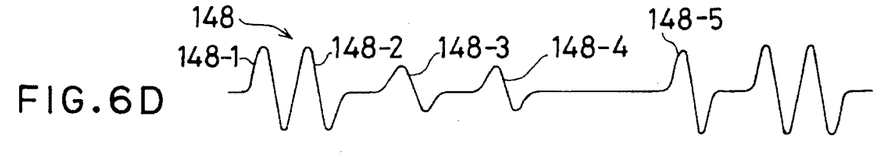

Further, a read waveform 148 in the on-track state of FIG. 6D is a read waveform which is obtained when the first magnetic recording servo pattern 134 is recorded subsequent to the magnetic recording servo pattern 140 in FIG. 5F and the servo head is on-tracked to a position 42-3.

From the relation between the recording of the servo information to the magnetic disk and the read waveforms as mentioned above, according to the present invention, each time the four kinds of different servo patterns are magnetically recorded as shown in FIG. 5F, the recorded servo patterns are read and stored into the memory 120. For a period of time during which the servo head 42 is sought to the next track, the digital signal processor 122 obtains either one of the read waveforms of the on-track state shown in FIGS. 6A to 6D from the preceding servo pattern read waveform stored in the memory 120 and the present servo pattern read waveform and executes the verification of the quality of the servo information by arithmetic operations In the verification of the servo information by the digital signal processor 122, with respect to the read waveform in the on-track state obtained by the arithmetic operation of the preceding servo pattern read waveform and the present servo pattern read waveform, a missing of pulses is checked, the presence or absence of extra pulses is discriminated, and further a position signal is obtained and the presence or absence of a spike error or line-out is judged.

Figure 7A:
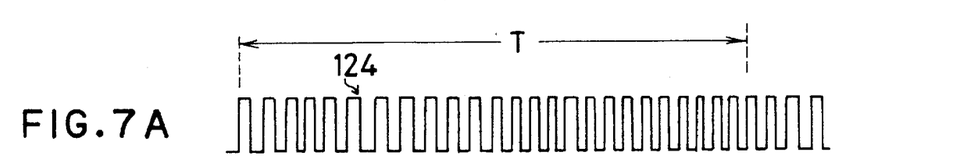
FIGS. 7A to 7E are explanatory diagrams showing waveforms in the on-track state obtained from read-out waveforms of the first and second servo patterns and also showing track recording magnetization states.
Figure 7B:
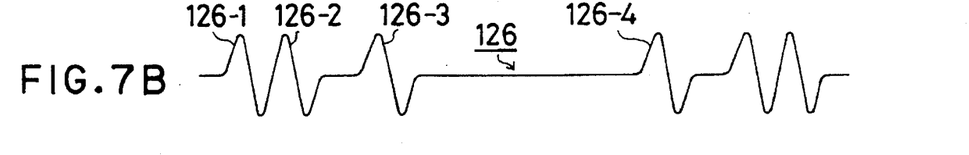
Figure 7C:
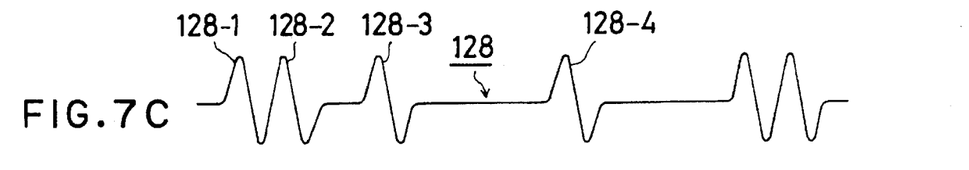
Figure 7D:
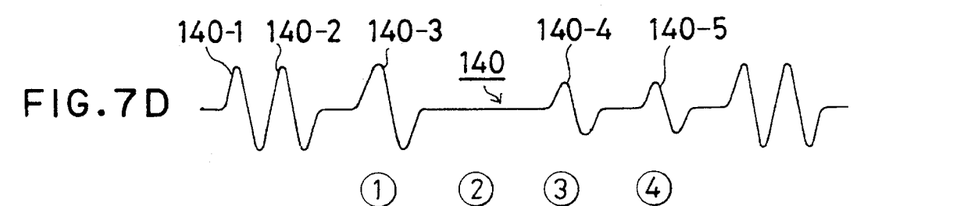
Figure 7E:
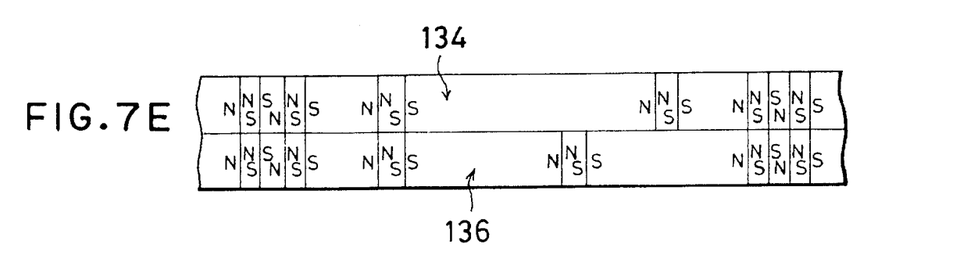

FIGS. 7A to 7D show verifying processes by the digital signal processor 122 in the case where, as shown in FIG. 7E, the magnetic recording servo pattern 134 is previously written and the magnetic recording servo pattern 136 is at present recorded to the next track. First, after the first magnetic recording servo pattern 134 of FIG. 7E was written, the first servo pattern read waveform 126 shown in FIG. 7B is sampled at the leading timing of the reference clocks 124 of FIG. 7A and stored into the memory 120. With respect to the first track, since there is no preceding track, the verifying process is not executed. Subsequently, as shown in FIG. 7E, the magnetic recording servo pattern 136 is written to the next track and the second servo pattern read waveform 128 shown in FIG. 7C is stored into the memory 120. As mentioned above, after the read waveforms of the preceding and present servo patterns shown in FIG. 7B and 7C could be stored into the memory 120, when the servo head is sought to the next track, the read waveform 140 in the on-track state shown in FIG. 7D is obtained as a waveform by adding the preceding read waveform 126 and the present read waveform 128 and dividing the resultant waveform by 2. In the read waveform 140 obtained by arithmetic operation in the on-track state, subsequent to first two index waveforms 140-1 and 140-2 for the period T, a waveform 140-3 having the same peak value is obtained at the timing of the magnetic polarity inverting position ①. No waveform is derived at the next magnetic polarity inverting position ②. A waveform 140-4 having the half peak value of the present waveform 128-4 and a waveform 140-5 having the half peak value of the preceding waveform 126-4 are respectively obtained at the magnetic polarity inverting positions ③ and ④. With respect to the waveform 140 in the on-track state obtained by the arithmetic operations shown in FIG. 7D, the index waveforms 140-1 and 140-2 are obtained every period T and a check is also made to see if the waveform 140-3 having the same peak value is correctly obtained at the position ① or not. That is, a check is made to see if there is a pulse missing such that the waveform which should inherently be obtained is not derived or a check is made to see if extra waveforms which should not inherently be generated are generated or not.

With respect to the position signal, a difference between the peak values of the small waveforms 140-4 and 140-5 derived at the positions ③ and ④ is obtained. The difference between the peak values of the waveforms 140-4 and 140-5 indicates a degree of on-track of the servo head. That is, when the servo head is accurately on-tracked, the difference between the peak values of the waveforms 140-4 and 140-5 is equal to 0. Namely, the waveforms 140-4 and 140-5 have the same peak value in the on-track state. On the other hand, when the servo head is deviated from the on-track position, the peak value of the waveform of the servo pattern locating at the deviated position increases, the peak value of the waveform of the servo pattern on the opposite side decreases, and a difference signal having a polarity according to the deviated direction increases. Therefore, by comparing the difference between the peak values of the waveforms 140-4 and 140-5 with a predetermined threshold value, an abnormality such as line-out, spike error, or the like can be judged.

Figure 8A:
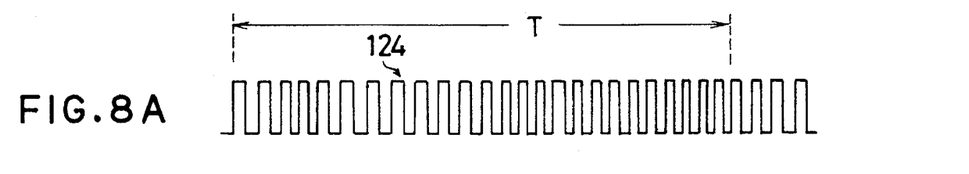
FIGS. 8A to 8E are explanatory diagrams showing waveforms in the on-track state obtained from read-out waveforms of the second and third servo patterns and also showing track recording magnetization states.
Figure 8B:
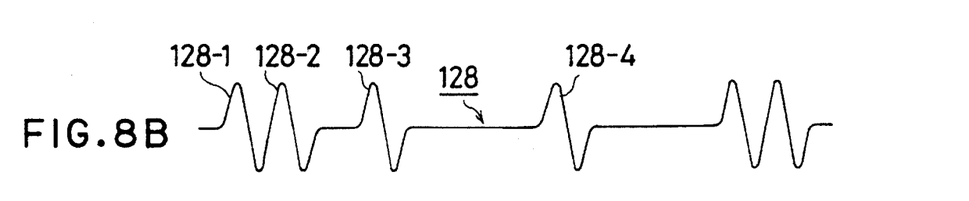
Figure 8C:
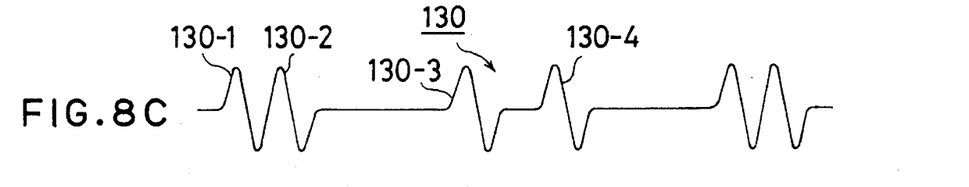
Figure 8D:
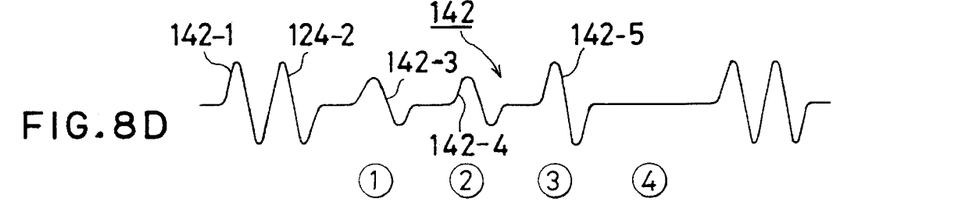
Figure 8E:
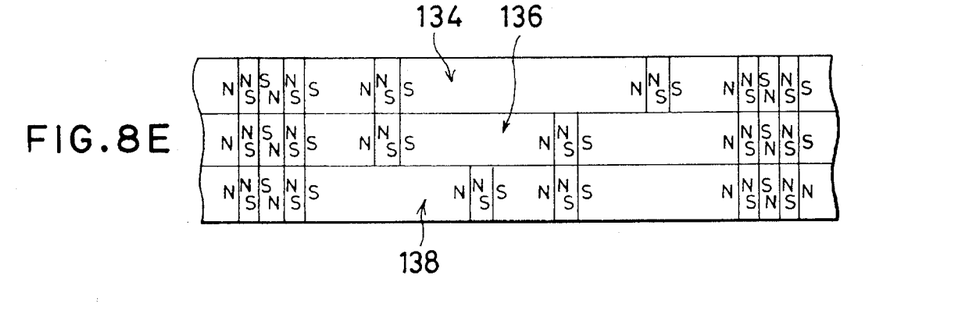
Figure 9A:
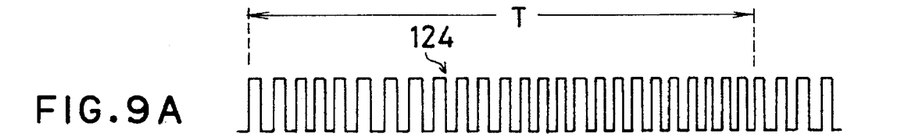
FIGS. 9A to 9E are explanatory diagrams showing waveforms in the on-track state obtained from the read-out waveforms of the third and fourth servo patterns and also showing track recording magnetization states.
Figure 9B:
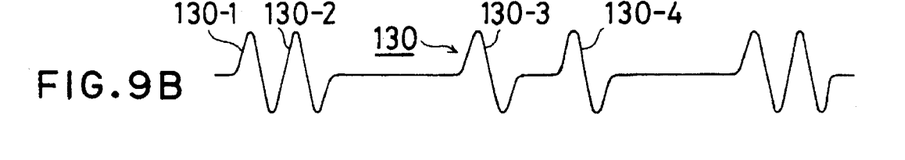
Figure 9C:
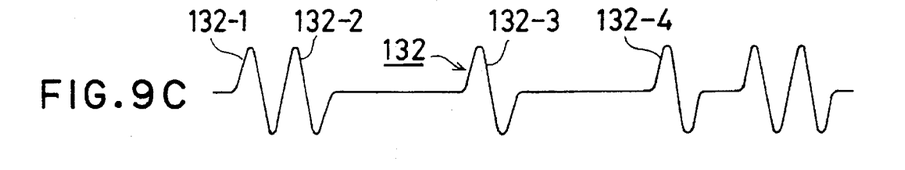
Figure 9D:
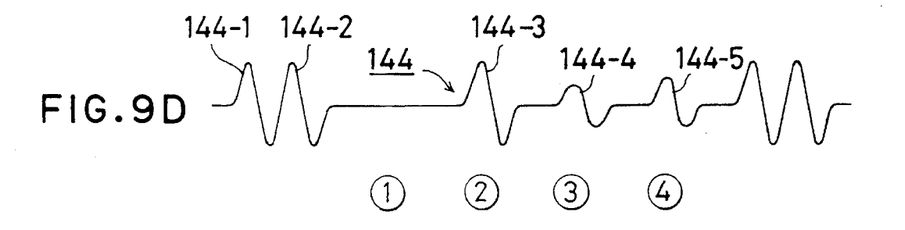
Figure 9E:
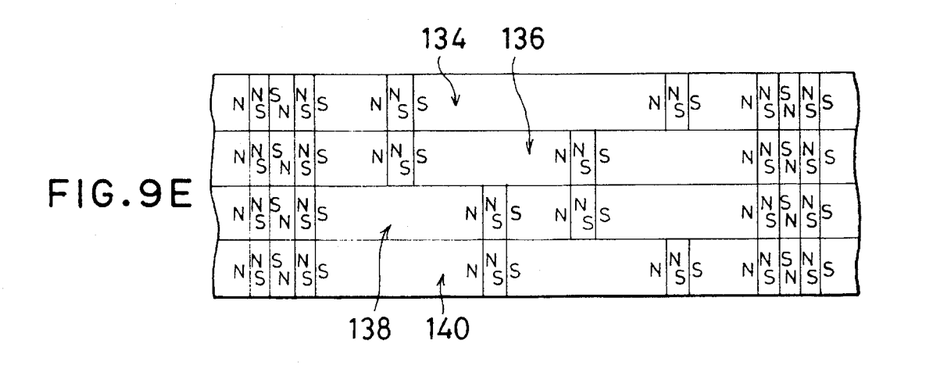
Figure 10A:
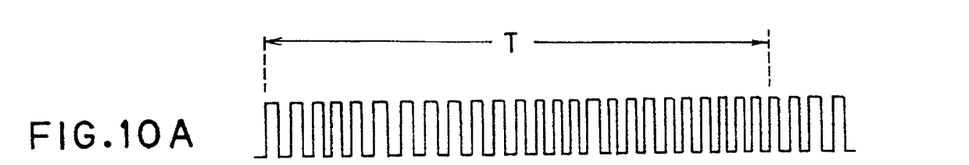
FIGS. 10A to 10E are explanatory diagrams showing waveforms in the on-track state obtained from read-out waveforms of the fourth and first servo patterns and also showing track recording magnetization states.
Figure 10B:
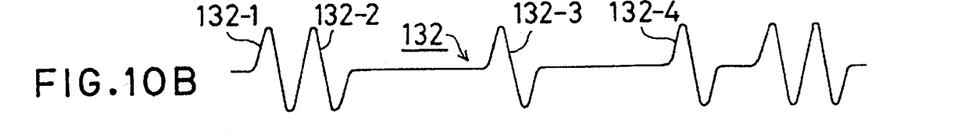
Figure 10C:
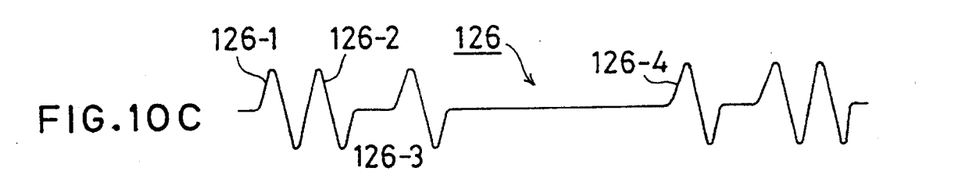
Figure 10D:
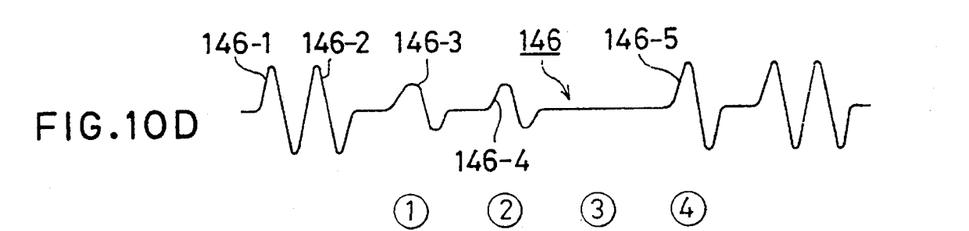
Figure 10E:
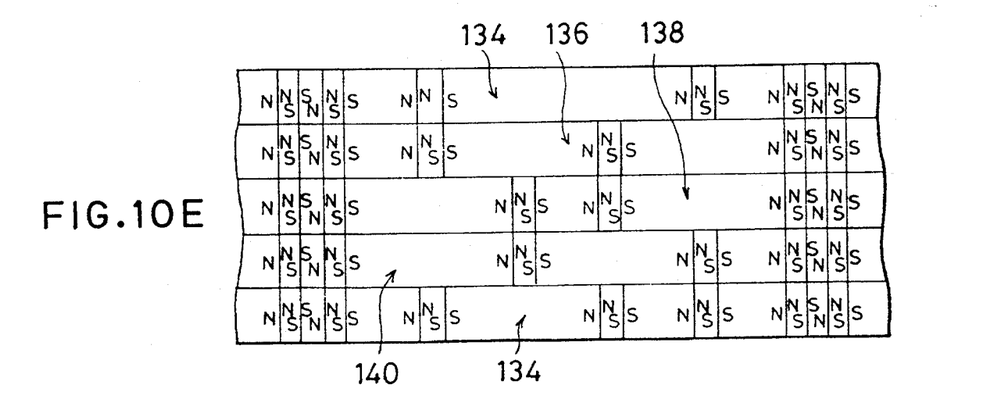

FIGS. 8A to 8D show read waveforms and arithmetic operation waveforms which are used for verification in the case where the magnetic recording servo pattern 138 was written to the next track subsequent to FIG. 7E as shown in FIG. 8E. FIGS. 9A to 9D show read waveforms and arithmetic operation waveforms which are used in the verifying process in the case where the magnetic recording servo pattern 140 was written to the next track as shown in FIG. 9E. Further, FIGS. 10A to 10D show read waveforms and arithmetic operation waveforms which are used for the verifying process in the case where the same magnetic recording servo pattern 134 as that in the first pattern was written to the next track as shown in FIG. 10E.

Figure 11:
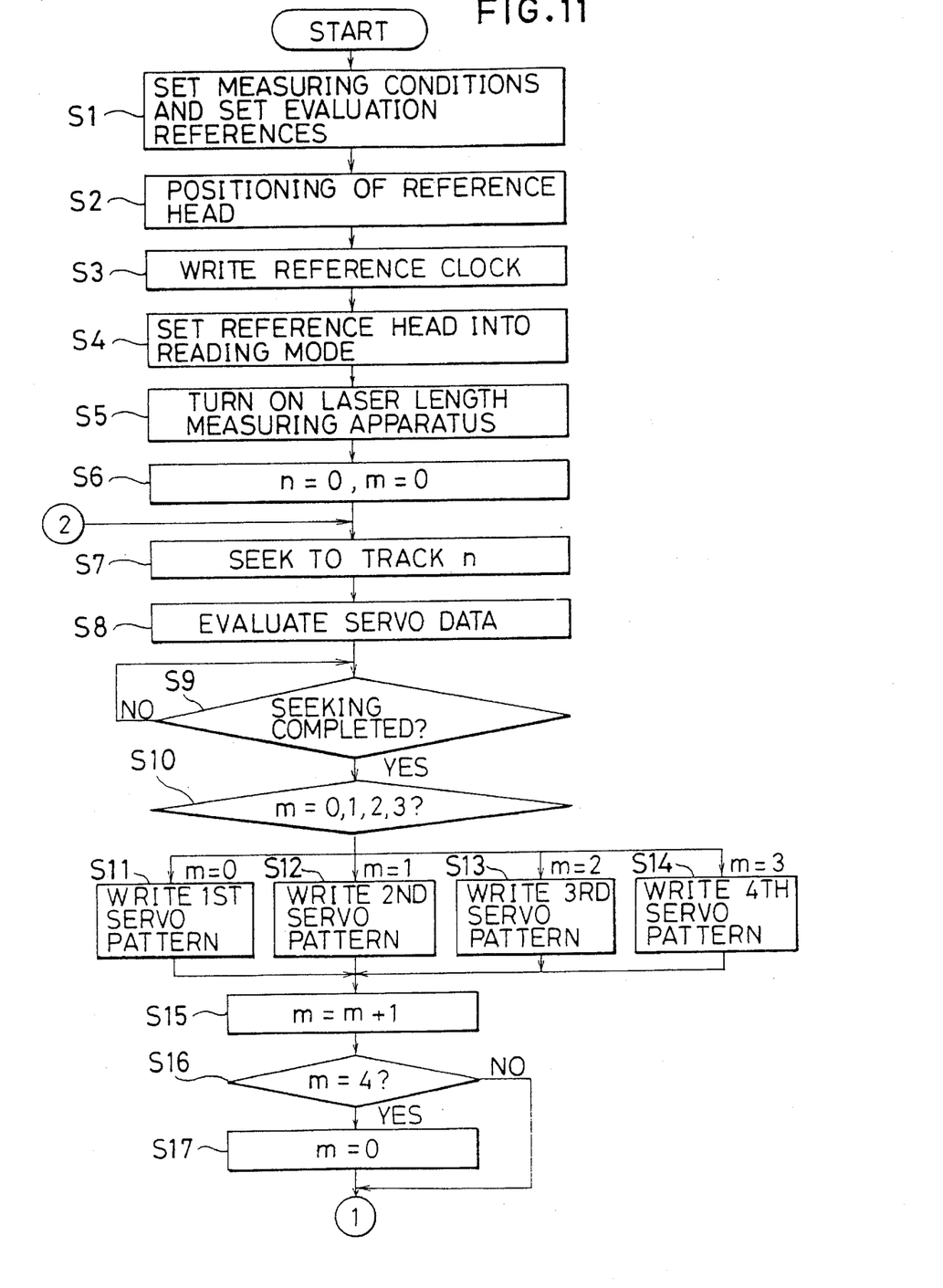
FIG. 11 is a flowchart showing a writing verifying process according to the present invention.

The writing and verifying processes of servo information of the present invention by the control unit 30 shown in FIG. 1 will now be described with reference to flowcharts of FIGS. 11 to 13. In the first step S1, the CPU 98 as a high-order apparatus sets measuring conditions for the laser length measuring device 20 and sets a verifying reference for the digital signal processor 122. In the next step S2, the reference head 16 is positioned to a proper data surface of the magnetic disk by the air cylinder 18 and the reference clock writing section 108 is activated, thereby writing the reference clocks of one track. After the reference clocks were written, the reference head 16 is switched to the reading mode in step S4. After that, the reading and writing operations are executed by using the reference clocks read by the reference head 16. In step S5, the laser length measuring apparatus 20 is made operative, thereby enabling the position of the servo head 42 to be detected. In step S6, a track counter n and a pattern kind counter m are reset to "0", respectively. In step S7, the servo head is sought to the track of the track counter n=0, namely, to the outermost track of the magnetic disk. In step S8, the verifying process of the servo data by the digital signal processor 122 is executed. However, the verifying process is not performed with regard to the first track but is executed for the second and subsequent tracks. In step S9, a check is made to see if the servo head has been sought to the track designated by the track counter n or not. After the seeking operation was completed, step S10 follows and the pattern kind counter m is checked. First, since the pattern kind counter m is m=0, step S11 follows and the first servo pattern is written. When the pattern kind counter m is m=1, 2, or 3 in step S10, the processing routine advances to step S12, S13, or S14, and the second, third, or fourth servo pattern is written. After a predetermined servo pattern was written, the count value of the pattern kind counter m is increased by "1". A check is made in step S16 to see if m=4 or not. When m is less than 4, the processing routine advances to step S18 in FIG. 12. When m=4, the pattern kind counter m is reset to 0 in step S17 and the processing routine is returned to the step of writing from the first servo pattern.

Figure 12:
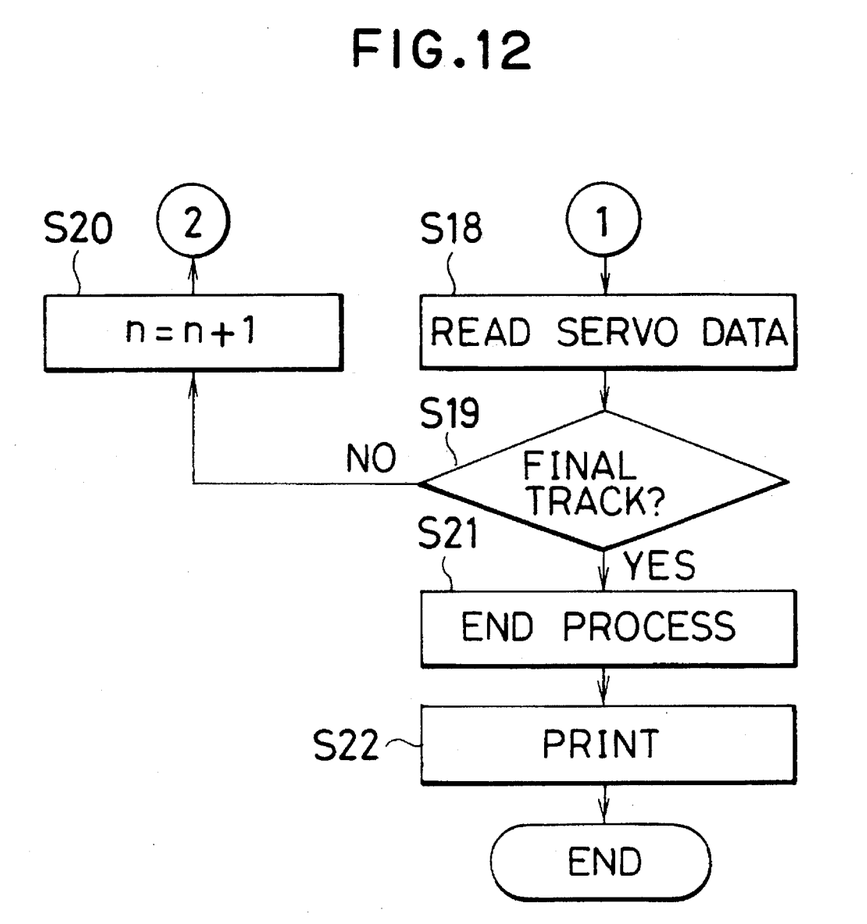
FIG. 12 is a flowchart showing a writing verifying process subsequent to FIG. 11.

In step S18 in FIG. 12, the servo pattern written on the track is read by the servo head and is sampled on the basis of the reference clocks read by the reference head 16 and is converted into the digital data. After that, the digital data is stored into the memory 120. In step S19, a check is made to see if the track is the final track or not by checking the value of the track counter n. If NO, the count value of the track counter n is increased by "1" in step S20. The processing routine is returned to step S7 in FIG. 11 and the servo head is sought to the next track. During the seeking operation of the second and subsequent times of the servo head, the verifying process of the servo data is executed in step S8.

Figure 13:
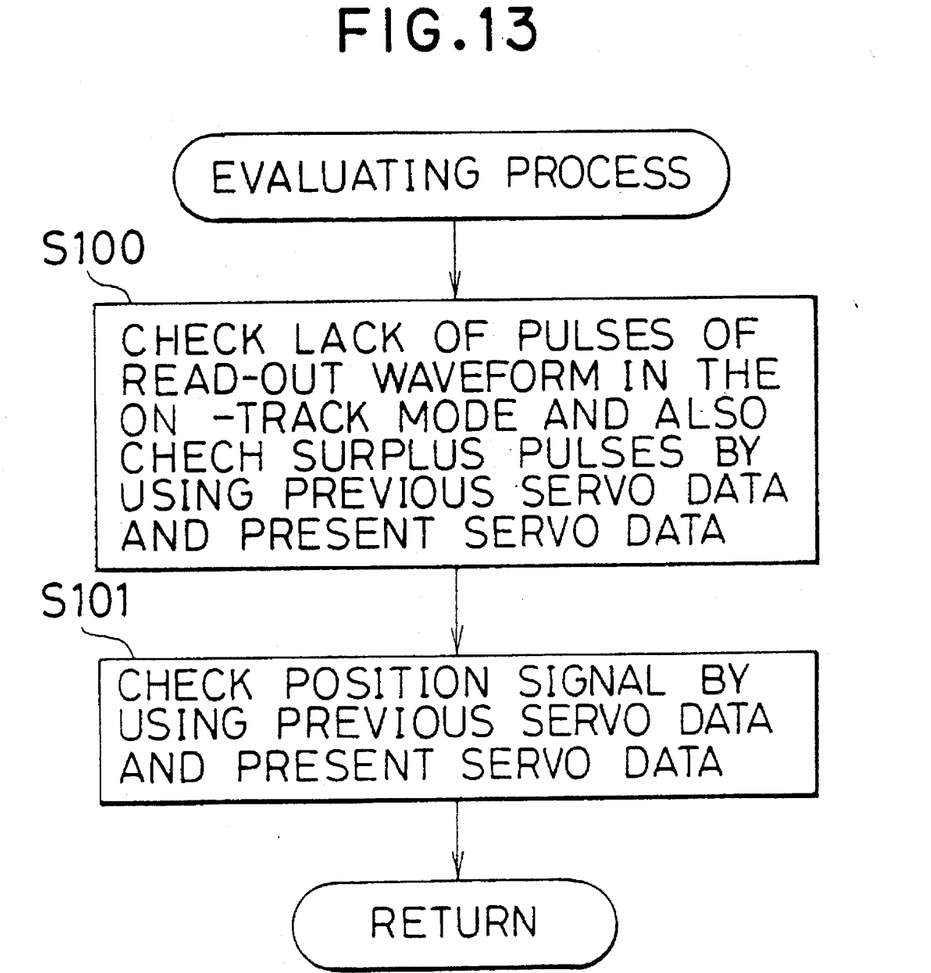
FIG. 13 is a flowchart showing a verifying process which is executed as a subroutine by a digital signal processor.

As shown in FIG. 13, the verifying process of the servo data is executed as a subroutine by the digital signal processor 122. In the verifying process which is executed by the digital signal processor, first, in step S100, the preceding servo data stored in the memory 120 and the present servo data are read out by one track and two read-out servo data are added and the resultant data is divided by 2, and a read waveform in the on-track state is generated as a value of the result of the division. With respect to the read waveform in the on-track state obtained by the arithmetic operations, a check is made to see if there is a missing of the necessary pulse waveforms or not and a check is also made to see if there are extra pulses or not. In the next step S101, with respect to the arithmetic operation waveforms in the on-track state using the preceding servo data which has already been obtained and the present servo data, for example, a position signal is obtained from a difference between the peak values of the arithmetic operation waveforms 140-4 and 140-5 at the magnetic polarity inverting positions ① and ④ in FIG. 7D. The position signal obtained is compared with a predetermined threshold value. The presence or absence of a spike error or a line-out error is judged by discriminating whether the position signal exceeds the predetermined threshold value or not. With respect to the above one track, the writing operation of the servo pattern, the reading operation of the servo pattern, and the verifying process of the servo pattern during the seeking operation of the servo head to the next track are continuously repeated from the outer track to the inner track of the magnetic disk.

When the final track is determined from the count value of the track counter n in step S19 in FIG. 12, the processing routine advances to step S21 and the necessary finishing process is executed. In step S22, the result of the verification of the servo information by the digital signal processor 122 is printed out by a printer. The writing and verifying processes of the servo information for one disk enclosure are finished.

According to the recording method of the servo information of the present invention, therefore, the servo patterns are written for one rotation of the disk, the servo patterns are read out for the next one rotation of the disk, and are sampled. The sampled data is stored into the memory. When the servo head is sought to the next track by the next one rotation of the disk, the quality of the servo information is verified. Consequently, only the time corresponding to three rotations of the disk is needed for the processes of one track. This means that the processing time can be reduced by 25% or more as compared with that by the conventional recording method of servo information which has been separately executed in both of the laser mode and the magnetic mode. On the other hand, since the quality of the servo information is verified by using the digital signal processor, as compared with the conventional verifying circuit using a hardware, the verifying process is hardly influenced by the circuit characteristics and noises and the quality verification of the servo information can be more accurately and stably executed.

In the embodiment, the read-out servo information has been sampled by the clocks which are obtained by frequency dividing the reference clocks into ½. However, it is also possible to construct in a manner such that the reference clocks are not frequency divided but the servo information is directly sampled by the double frequency, thereby increasing a sampling resolution of the read waveform, and the shape itself of the waveform in the on-track state is reproduced and can be also verified.

In the above embodiment, further, although the servo information has been verified by the writing and reading operations of the servo information by using the servo head built in the disk enclosure, it is also possible to perform the verification by the writing and reading operations of the servo information for the magnetic disk in the disk enclosure by using a servo head provided on the servo track writer side.

Further, the present invention is not limited by the numerical values shown in the embodiment. The present invention is not limited to the foregoing embodiment but many modifications and variations are possible within the spirit and scope of the appended claims of the invention.

What is claimed is:

1. A method for recording servo information on a plurality of tracks on a magnetic disk medium using a head, the head being capable of writing information on the tracks and reading information from the tracks, the plurality of tracks being adjacent to a first track and successively adjacent to each other, the first track having previously recorded servo information, comprising the steps of writing servo information on a first selected one of the plurality of tracks which is adjacent to the first track or a previously recorded one of the plurality of tracks;

reading out the servo information written on said first selected track in said writing step;

converting the servo information read out into digital servo information;

storing said digital servo information into a memory;

seeking a second selected one of the plurality of tracks;

verifying said servo information, at least part of said verifying step occurring during said seeking step; and repeating said writing, reading, seeking and verifying steps for the successive ones of the plurality of tracks.

2. A method according to claim 1, wherein in said writing step, reference clocks which have previously been written to the magnetic disk medium are read out by a reference head and at least four kinds of different first to fourth servo patterns are sequentially repeatedly written as said servo information on a adjacent tracks synchronously with the read-out reference clocks, and in the reading step, an analog signal of the read-out servo patterns is sampled by the reference clocks read out by said reference head and stored into the memory on a track unit basis.

3. A method according to claim 2, wherein the first to fourth servo patterns which are written in said writing step have positions-to selectively invert first, second, third, and fourth magnetic polarities subsequent to a magnetic polarity inverting position indicative of index information, the first servo pattern inverting the magnetic polarity at the first and fourth positions, the second servo pattern inverting the magnetic polarity at the first and third positions, the third servo pattern inverting the magnetic polarity at the second and third positions, and the fourth servo pattern inverting the magnetic polarity at the second and fourth positions, the same servo pattern being repeatedly written to one track, and the first to fourth servo patterns being sequentially repeatedly written on adjacent track.

4. A method according to claim 1, wherein in said verifying step, a missing of pulses of a read waveform in an on-track state is discriminated from a mean value of sampling peak values of pulse waveforms which are generated at a same magnetic polarity inverting position of the preceding servo pattern and the present servo pattern.

5. A method according to claim 1, wherein in said verifying step, a presence or absence of extra pulses of a read waveform generated by said reading in an on-track state is discriminated from a mean value of sampling values at position where a magnetic polarity is not inverted in the preceding servo pattern and the present servo pattern.

6. A method according to claim 1, wherein in said verifying step, a check is made to see if a position signal is good or not from a difference of mean values of sampling peak values of waveforms generated by said reading at positions where magnetic polarity is inverted in only either one of the preceding servo pattern and the present servo pattern.

7. A method according to claim 1, wherein in said verifying step, the servo information stored in the memory is read out and processed by a digital signal processor.

8. The method of claim 1 wherein said verifying step comprises the steps of arithmetically calculating digital servo information from said stored digital servo information while the head is seeking said second selected track and successive ones of the plurality of tracks, and reading said stored digital servo information from said memory to verify the stored digital information using said calculated digital servo information.

9. The method of claim 8 wherein in said calculated digital servo information is verified is located between said first selected track and said second selected track.

10. A method according to claim 1 wherein said head is a servo head built in a disc enclosure having the magnetic disk medium on which the servo information is written.

11. A method according claim 1, wherein said head is a special head only for use in a servo writer, said head being built in a disk enclosure having the magnetic disk medium on which the servo information is recorded, said head being positioned from outside of the disk enclosure.

* * * * *